(12) United States Patent
Bell

(10) Patent No.: US 9,790,997 B2
(45) Date of Patent: Oct. 17, 2017

(54) ASSEMBLY FOR PREVENTING ABUSE OF A PUMP MOUNTED TO A DRIVER EQUIPMENT

(71) Applicant: Electro-Motive Diesel, Inc., LaGrange, IL (US)

(72) Inventor: Stuart Bell, Chicago Heights, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 405 days.

(21) Appl. No.: 14/488,376

(22) Filed: Sep. 17, 2014

(65) Prior Publication Data
US 2016/0076599 A1    Mar. 17, 2016

(51) Int. Cl.
| | |
|---|---|
| *F16D 9/06* | (2006.01) |
| *F16H 35/10* | (2006.01) |
| *F16D 1/072* | (2006.01) |
| *F16D 1/06* | (2006.01) |
| *F16D 1/10* | (2006.01) |

(52) U.S. Cl.
CPC .............. *F16D 9/06* (2013.01); *F16H 35/10* (2013.01); *F16D 1/072* (2013.01); *F16D 2001/062* (2013.01); *F16D 2001/103* (2013.01); *F16H 2035/103* (2013.01)

(58) Field of Classification Search
CPC ...... F16D 9/06; F16D 2001/103; F16H 35/10; F16H 2035/103; F04C 2/14; F04C 15/0073
USPC ........................................................ 418/69
See application file for complete search history.

(56) References Cited

U.S. PATENT DOCUMENTS

| | | | |
|---|---|---|---|
| 2,699,724 A | 1/1955 | Murray | |
| 4,483,128 A * | 11/1984 | Hawkins | ................ A01D 69/06 475/263 |
| 4,604,035 A | 8/1986 | Roberts | |
| 6,039,115 A | 3/2000 | Mills | |
| 6,050,795 A | 4/2000 | Bodzak et al. | |
| 7,331,873 B2 | 2/2008 | Ibrahim et al. | |
| 2003/0098216 A1* | 5/2003 | Hayashi | ................ F16D 41/066 192/48.92 |
| 2009/0047162 A1* | 2/2009 | Uchikado | ........... F04B 27/0895 418/69 |

FOREIGN PATENT DOCUMENTS

| | | |
|---|---|---|
| DE | 3638596 | 5/1988 |
| GB | 1589378 | 5/1981 |

* cited by examiner

*Primary Examiner* — Mark Laurenzi
*Assistant Examiner* — Anthony Ayala Delgado
(74) *Attorney, Agent, or Firm* — Mattingly Burke Cohen & Biederman LLP

(57) ABSTRACT

An assembly for preventing abuse of a pump mounted to a driver equipment is provided. The driver equipment and the pump have a mutually intermeshed driver gear and a driven gear respectively. The assembly includes a coupler splined to a shaft of the pump and configured to transmit torque from the driven gear to the shaft. The assembly also includes fasteners that are configured to releasably fasten the coupler to an end face of the driven gear. The fasteners are configured to shear, and disconnect the coupler from the driven gear when a torque on the driven gear exceeds an operational torque of the pump.

19 Claims, 5 Drawing Sheets

ASSEMBLY FOR PREVENTING ABUSE OF A PUMP MOUNTED TO A DRIVER EQUIPMENT

TECHNICAL FIELD

The present disclosure generally relates to an assembly for preventing abuse of a pump that is mounted to a driver equipment. More particularly, the present disclosure relates to an assembly that prevents operation of a pump by a driver equipment after the pump has been rendered non-operational.

BACKGROUND

Typically, pumps are connected to various types of prime movers or driver equipment such as engines and electric motors in order to be driven for pumping of a fluid. Often, these pumps are provided with a gear that is meshed with a gear of the driver equipment. In most cases, these gears of the pump and the driver equipment may not have the capability to selective mesh or un-mesh from each other. Hence, when the pump is rendered inoperable, for e.g. from seizure or failure of a component therein, the driver equipment may continue to inadvertently drive the pump thereby increasing the possibility of abusing the pump.

Numerous systems have been developed in the past to operate the pump in a fail-safe mode or an overload-protection mode. For reference, U.S. Pat. No. 7,331,873 discloses a fail-safe device that can be used to break a rotational coupling between an apparatus, such as a pump, and a drive component, such as a crank shaft of an engine, in the event of the apparatus seizing so that damage to the drive component may be prevented.

However, most of the developed or conventionally known systems allow the gear of the pump to disengage from the driver gear after seizure of the pump instead of allowing the gear to remain in mesh and free-wheel without any connection to the pump shaft. As such, the immediate disengagement of the rotating gears may cause edges of the gears to run past each other and result in damage to the gears.

Therefore, there is a need for a system to overcome the above mentioned shortcomings.

SUMMARY OF THE DISCLOSURE

In one aspect, the present disclosure discloses an assembly for preventing abuse of a pump mounted to a driver equipment. The driver equipment and the pump have a mutually intermeshed driver gear and a driven gear respectively. The assembly includes a coupler splined to a shaft of the pump and configured to transmit torque from the driven gear to the shaft. The assembly also includes fasteners that are configured to releasably fasten the coupler to an end face of the driven gear. The fasteners are configured to shear, and disconnect the coupler from the driven gear when a torque on the driven gear exceeds an operational torque of the pump.

In another aspect, the present disclosure discloses an assembly for preventing abuse of a pump mounted to a driver equipment. The driver equipment and the pump have a driver gear and a driven gear mutually intermeshed with each other. The assembly includes a shroud member defining a first aperture on a first sidewall that is disposed proximal to a body of the pump. The assembly further includes a hollow elongated stub-shaft including a first flange, and a hub member axially extending from the first flange. The first flange is held in abutment between the body of the pump and the first sidewall of the shroud member. The hub member is received within the shroud member via the first aperture and is disposed about a shaft of the pump to define an elongated annular space therebetween.

Moreover, the assembly further includes a coupler that is configured to transmit torque from the driven gear to the shaft. The coupler includes a collar and a second flange. The collar is disposed in the elongated annular space and rotatably connected to the hub member. The collar is also coupled to the shaft of the pump to rotate in unison with the shaft. The second flange laterally extends away from an end of the collar, and is configured to bear against an end face of the driven gear. The assembly further includes fasteners that releasably fasten the coupler to an end face of the driven gear. The fasteners are configured to shear, and disconnect the coupler from the driven gear when a torque on the driven gear exceeds an operational torque of the pump.

In yet another aspect, the present disclosure discloses a method of preventing abuse of a pump that is mounted to a driver equipment. The driver equipment and the pump have a mutually intermeshed driver gear and a driven gear respectively. The method includes providing a coupler splined to a shaft of the pump so as to rotate in unison with the shaft, wherein the coupler is configured to transmit torque from the driven gear to the shaft. The method further includes releasably fastening the coupler to an end face of the driven gear using a plurality of fasteners, wherein the fasteners are configured to shear, and disconnect the coupler from the driven gear when a torque on the driven gear exceeds an operational torque of the pump.

Other features and aspects of this disclosure will be apparent from the following description and the accompanying drawings.

DETAILED DESCRIPTION

Figure 1:
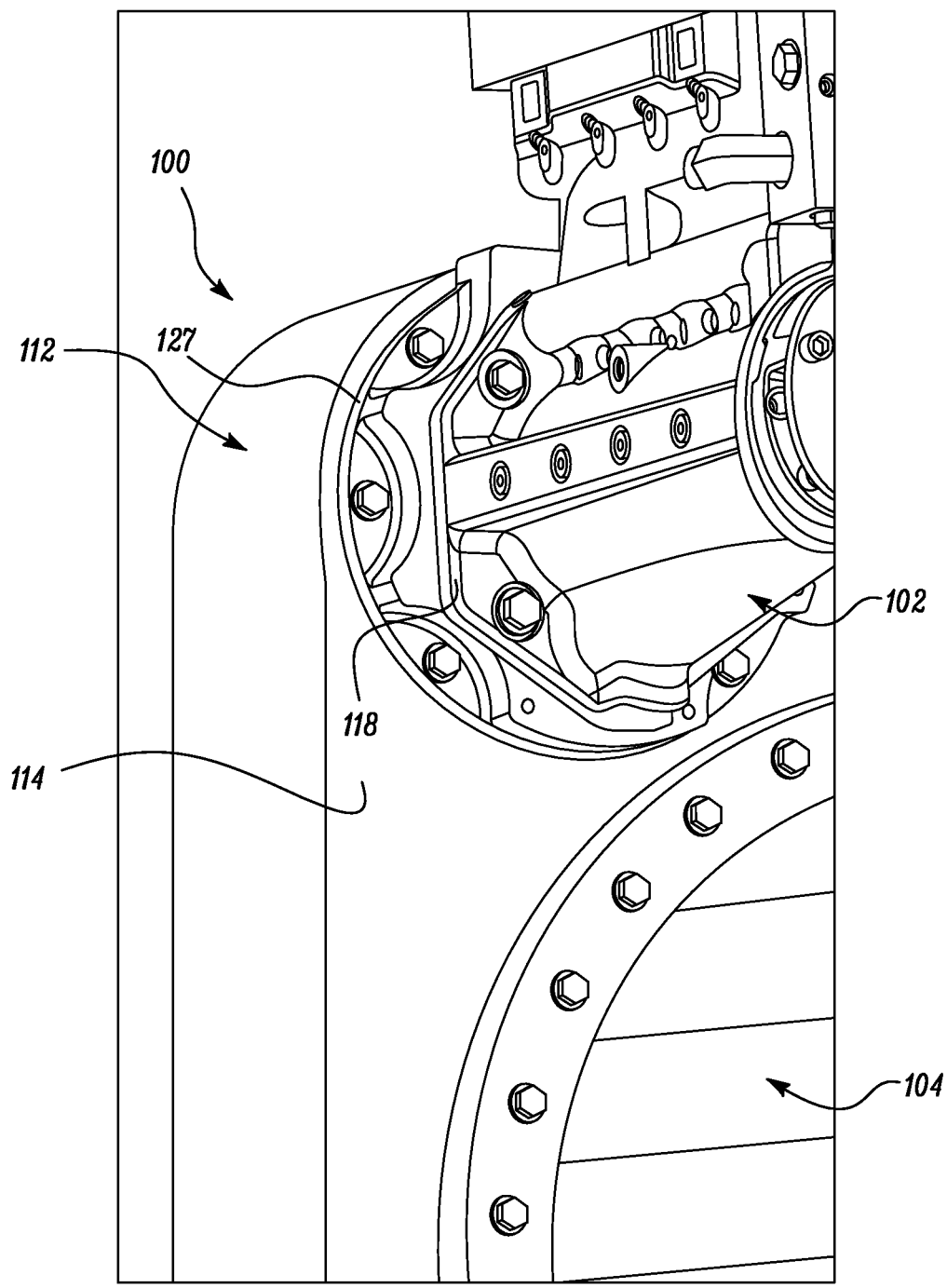
FIG. 1 is a rear perspective view of an assembly in accordance with an embodiment of the present disclosure, employed to prevent abuse of a pump that is mounted to a driver equipment.

FIG. 1 illustrates a rear perspective view of an assembly in accordance with an embodiment of the present disclosure. The assembly 100 is used to prevent abuse of a pump 102 that is mounted to a driver equipment 104. In one embodiment, the pump 102 may embody a reciprocating pump, for example, a piston pump. In another embodiment, the pump 102 can be a rotary pump, for example, a gerotor pump, or a vane pump. Therefore, any type of pump known to one of ordinary skill in the art may be employed to realize various embodiments disclosed herein.

In an embodiment, the driver equipment 104 may be an engine configured to combust fuel and generate power from the combustion process. In one embodiment, the driver equipment 104 may be a gasoline engine. In another embodiment, the driver equipment 104 may be a diesel engine. In yet another embodiment, the engine may be of a type configured to burn natural gas. Alternatively, the driver equipment 104 may be embodied in the form of an electric motor that is configured to generate power from electricity.

Although various types of driver equipment and pumps are disclosed herein, it should be noted that the type or configuration of the driver equipment 104 and the pump 102 is merely exemplary and non-limiting of this disclosure. One of ordinary skill in the art will acknowledge that embodiments of the present disclosure can be equally applied to various other types of driver equipment and pumps known in the art without deviating from the spirit of the present disclosure.

Figure 2:
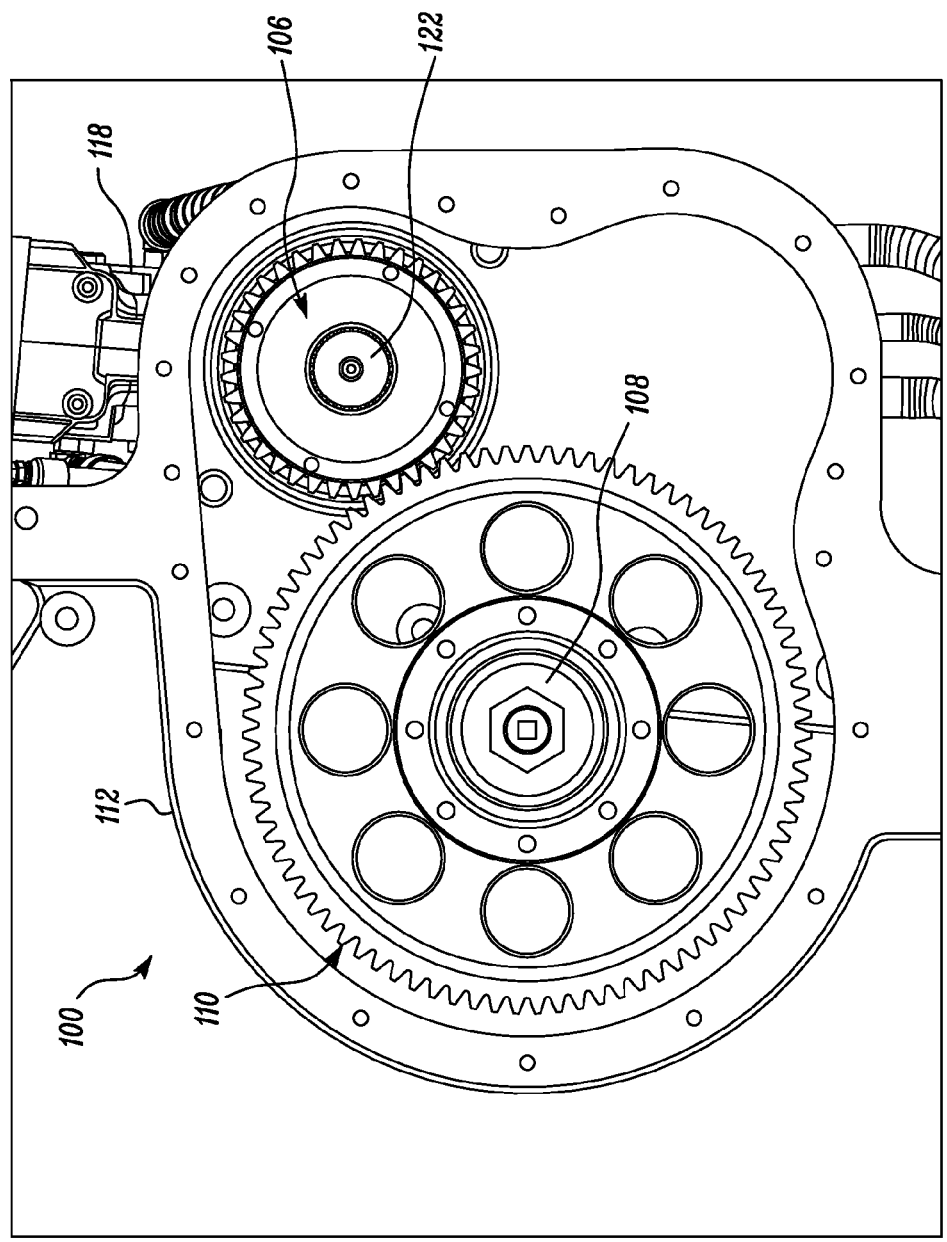
FIG. 2 is a front view showings gears of the exemplary pump and driver equipment of FIG. 1.

The present disclosure relates to the assembly 100 that is configured to prevent operation of the pump 102 by the driver equipment 104 after the pump 102 has been rendered non-operational. Referring to FIG. 2, the pump 102 includes a shaft carrying a driven gear 106 thereon. Similarly, the driver equipment 104 includes a drive shaft 108 carrying a drive gear 110 thereon. The drive gear 110 and the driven gear 106 are mutually meshed, and hence, regarded as being disposed in rotatable engagement with each other.

During operation, the drive gear 110 may rotate to transmit torque into the driven gear 106. The driven gear 106 then transfers the torque into the shaft of the pump 102 thereby providing the necessary power for pumping of a fluid for e.g., fuel or oil. Although the driven gear 106, as shown in FIG. 2, is disposed in direct mesh with the gear of the driver equipment 104, it may be optionally contemplated to provide additional and/or auxiliary gears, for e.g., idler gears, that are intermeshed with both gears to transmit power from the drive gear 110 to the driven gear 106. As known to one skilled in the art, such additional and/or auxiliary gears may beneficially provide a step-reduction or an increase in the gear-transmission ratio between the two gears. Moreover, such additional and/or auxiliary gears may optionally be provided to accommodate and/or compensate for specific physical requirements and/or other space constraints encountered in a given application.

Figure 3:
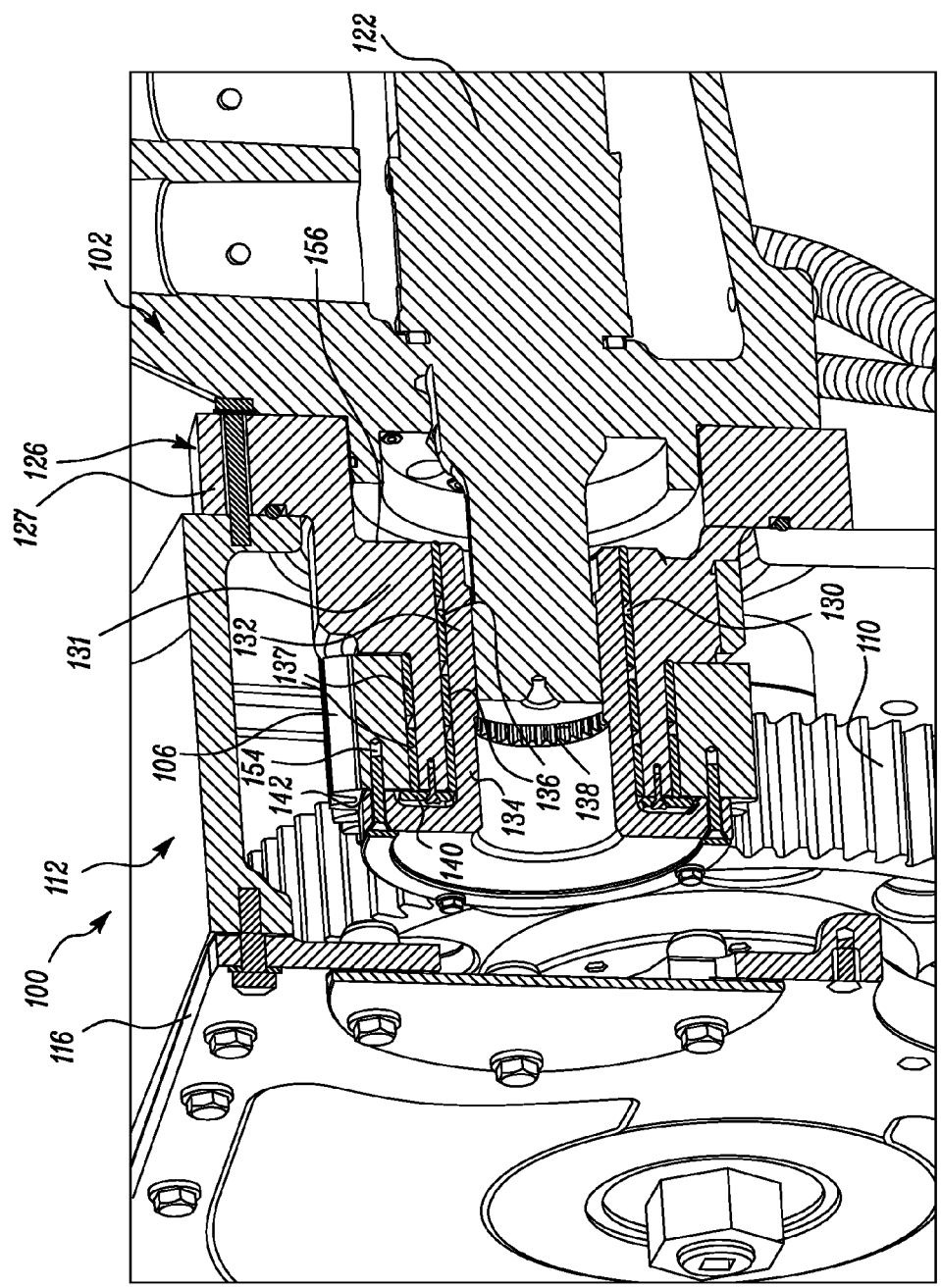
FIG. 3 is a sectional view of the assembly taken along A-A' of FIG. 2, the sectional view showing fasteners associated with the gear of the exemplary pump.

Referring to FIGS. 1, 2, and 3, the assembly 100 includes a shroud member 112 having a first sidewall 114 and a second sidewall 116. The first sidewall 114 is disposed proximal to a body 118 of the pump 102. The first sidewall 114 defines a first aperture 120 extending therethrough. With continued reference to FIGS. 1, 2, and 3 and as best shown in FIG. 3, the second sidewall 116 is spaced apart from the driven gear 106 of the pump 102 and disposed in an opposing relation to the first sidewall 114.

Figure 4:
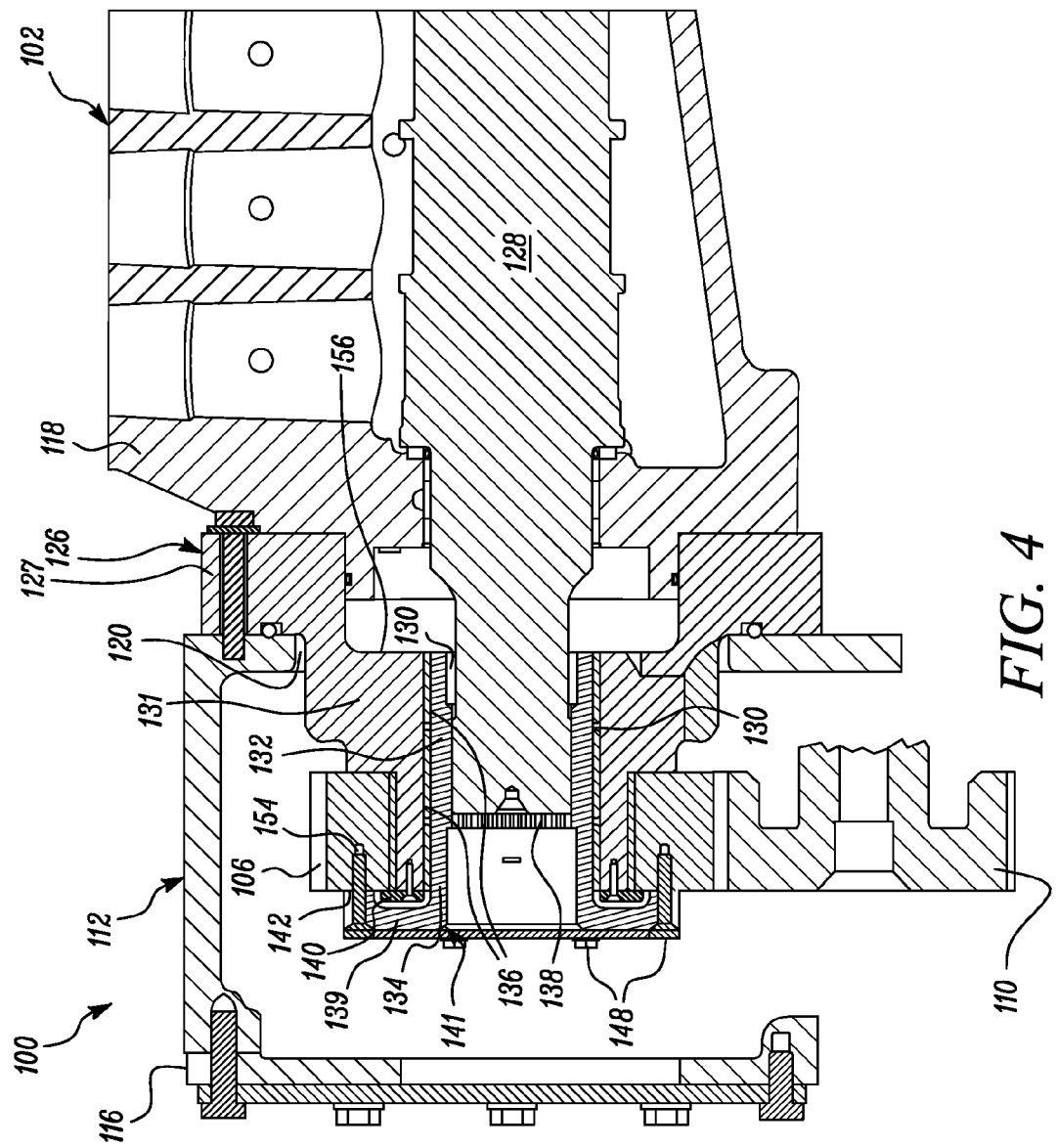
FIG. 4 is a side sectional view of the assembly taken along A-A' of FIG. 2, the side sectional view showing the arrangement and relative sizes of various components therein.

Referring now to FIGS. 3 and 4, the assembly 100 further includes a hollow elongated stub-shaft 126 having a first flange 127 and a hub member 131 axially extending from the first flange 127. The elongated stub-shaft 126 is partially disposed within the shroud member 112 i.e., with the hub member 131 being received within the shroud member 112 via the first aperture 120 while the first flange 127 is located outside of the shroud member 112. The first flange 127 is held in abutment between the body 118 of the pump 102 and the first sidewall 114 of the shroud member 112. The hub member 131 is disposed about the shaft of the pump 102 to define an elongated annular space 130 therebetween.

The assembly 100 further includes a coupler 141 splined to the shaft of the pump 102. The coupler 141 is configured to transmit torque from the driven gear 106 to the shaft. Specifically, as illustrated in the embodiments of FIGS. 3 and 4, the coupler 141 includes a collar 132 and a second flange 139. The collar 132 axially extends from the second flange 139 and is disposed in the elongated annular space 130. The collar 132 is rotatably connected to the hub member 131 by a first set of bearings 136. In various embodiments of the present disclosure, it is beneficially contemplated to form the second flange 139 and the collar 132 integrally so that the second flange 139 and the collar 132 rotate in unison to transmit power from the driven gear 106 to the shaft of the pump 102.

Moreover, the collar 132 is also splined to the shaft of the pump 102 so as to rotate in unison with the shaft. As shown, the collar 132 and the shaft include interfitting splines 138 defined on an inner surface of the collar 132 and an outer surface of the shaft. However, in an alternative embodiment, the collar 132 and the shaft may be coupled with the help of a key and slot arrangement, or other structures commonly known to one skilled in the art.

Further, as best shown in FIG. 3, the driven gear 106 is disposed about the hub member 131 and rotatably connected thereto with the help of a second set of bearings 137. The second flange 139 laterally extends away from an end 134 of the collar 132 and bears against an end face 142 of the driven gear 106. With reference to FIGS. 3 and 4, the assembly 100 further includes fasteners 148 that are configured to releasably fasten the coupler 141 to the end face 142 of the driven gear 106. As shown, the driven gear 106 also defines a plurality of threaded receptacles 154. The threaded receptacles 154 are configured to receive the fasteners 148 and releasably couple the second flange 139 of the coupler 141 to the driven gear 106.

The fasteners 148 disclosed herein may be hex-bolts, as shown, or may include other types of fasteners 148 such as, but not limited to, Allen screws and grub screws. A person having ordinary skill in the art will acknowledge that although hex-bolts, Allen screws, and grub screws are disclosed herein, various other types of fasteners 148 may be suitable employed in lieu of the hex-bolts, Allen screws, and the grub screws.

With help of the fasteners 148, the torque transmitted to the driven gear 106 may be transferred into the coupler 141 and thereafter to the splined shaft of the pump 102. Therefore, the coupler 141 assists in coupling the shaft of the pump 102 to the driven gear 106. Although the fasteners 148 help in the transmission of torque from the driven gear 106 into the coupler 141 and thereafter the shaft, the fasteners 148 are also configured to shear when a torque on the driven gear 106 exceeds an operational torque of the pump 102.

It is commonly known to one of ordinary skill in the art that if the pump 102 seizes for any reason such as, for example, a bearing failure, the pump's resistance to rotation will be transferred to the driven gear 106 via the shaft. This resistance can possibly damage the pump 102 itself. Alternatively, this resistance can be transferred back to the drive shaft 108 associated with the driver equipment 104, and could possibly damage the engine. At this point, it may be understood that a torque on the driven gear 106 exceeds an operational torque of the pump 102. In such an event, shearing of the fasteners 148 under the excess torque can disconnect the coupler 141 from the driven gear 106. The shearing of the fasteners 148, disclosed herein, may occur in a plane transverse to a longitudinal axis of the fasteners 148.

Moreover, as shown in FIGS. 3 and 4, the assembly 100 further includes a thrust plate 140 that is fastened to an end face 156 of the hub member 131 and held in abutment with the end face 142 of the driven gear 106. The thrust plate 140 is configured to axially restrain a movement of the driven gear 106 upon shearing of the fasteners 148.

Further, upon shearing of the fasteners 148, the coupler 141 may become disconnected and slide outwards of the elongated annular space 130. However, in various embodiments of the present disclosure, it is envisioned that the second sidewall 116 serves as a stop for the axially displaced coupler 141 after the coupler 141 becomes disconnected from the driven gear 106.

Therefore, at any point during operation, if the pump 102 seizes, the torque on the driven gear 106 increases substantially so as to cause the fasteners 148 to shear. Shearing of the fasteners 148 renders the coupler 141 free of its connection with the driven gear 106. In such an event, the driven gear 106 is now capable of free-wheeling in rotation with the drive gear 110.

One of ordinary skill in the art will acknowledge that the loss of connection between the driven gear 106 and the coupler 141 i.e., by shearing of the fasteners 148, ensures that the driven gear 106 free-wheels in rotation with the drive gear 110 and that no torque is transmitted to the shaft of the pump 102. In this manner, the shearing of the fasteners 148 mitigates any damage to the pump 102, and therefore, prevents abuse of the pump 102 once the pump 102 has been rendered non-operational due to seizure or other reasons.

In realizing the embodiments of the present disclosure, it is hereby envisioned that the shear yield strength of the fasteners 148 is comparable or equal to the operational torque of the pump 102 so that any excess torque on the driven gear 106 may shear the fasteners 148 and disconnect the driven gear 106 from the shaft of the pump 102.

Figure 5:
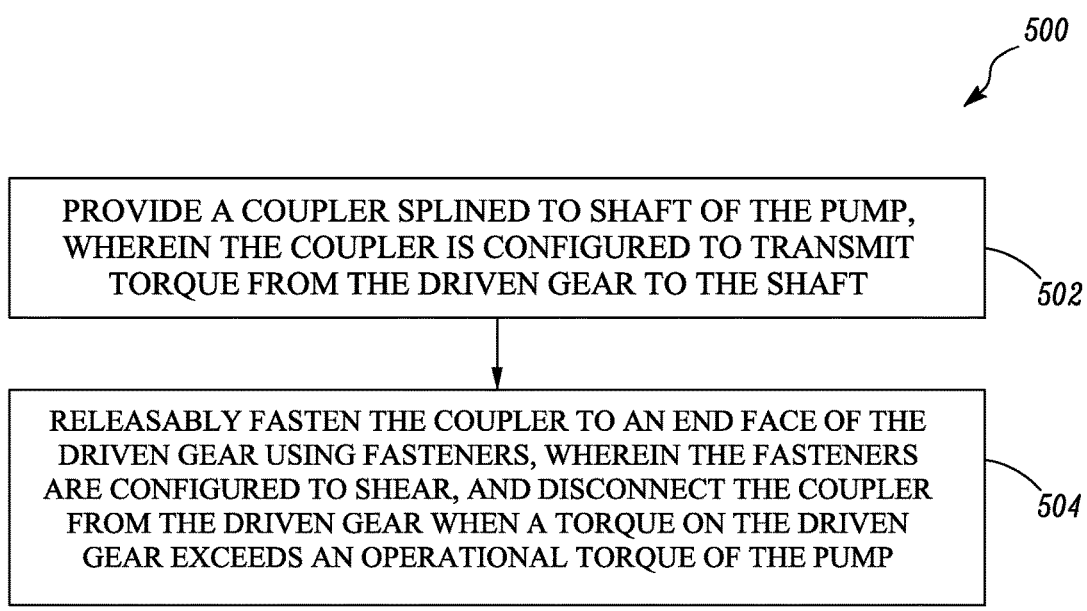
FIG. 5 is a method of preventing abuse to a pump that is driven by a driver equipment.

FIG. 5 is a method 500 of preventing abuse to the pump 102 that is driven by the driver equipment 104. At step 502, the method 500 includes providing a coupler 141 splined to a shaft 122 of the pump 102 so as to rotate in unison with the shaft 122, wherein the coupler 141 is configured to transmit torque from the driven gear 106 to the shaft 122. At step 504, the method 500 further includes releasably fastening the coupler 141 to an end face 142 of the driven gear 106 using the fasteners 148, wherein the fasteners 148 are configured to shear, and disconnect the coupler 141 from the driven gear 106 when a torque on the driven gear 106 exceeds an operational torque of the pump 102.

Various embodiments disclosed herein are to be taken in the illustrative and explanatory sense, and should in no way be construed as limiting of the present disclosure. All directional references (e.g., inward, outward, radial, upper, lower, upward, downward, left, right, leftward, rightward, L.H.S, R.H.S, top, bottom, above, below, vertical, horizontal, clockwise, and counter-clockwise) are only used for identification purposes to aid the reader's understanding of the present disclosure, and may not create limitations, particularly as to the position, orientation, or use of the devices and/or methods disclosed herein. Joinder references (e.g., attached, affixed, coupled, engaged, connected, and the like) are to be construed broadly. Moreover, such joinder references do not necessarily infer that two elements are directly connected to each other.

Additionally, all numerical terms, such as, but not limited to, "first", "second", "third", or any other ordinary and/or numerical terms, should also be taken only as identifiers, to assist the reader's understanding of the various embodiments, variations and/or modifications of the present disclosure, and may not create any limitations, particularly as to the order, or preference, of any embodiment, variation and/or modification relative to, or over, another embodiment, variation and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure has applicability in prevent abuse of a pump that is mounted to a driver equipment 104. More specifically, the present disclosure has applicability for preventing operation of a pump by a driver equipment 104 after the pump has been rendered non-operational.

As pumps are typically geared to a driver equipment 104, it is also known to one skilled in the art that upon seizure of the pump and with torque being continuously transmitted from the drive gear 110 to the driven gear 106, the torque experienced by the driven gear 106 increases manifold. The continuous transmission of torque from the drive gear 110 to the driven gear 106 even after the pump 102 has seized increases the possibility of a further damage to the pump 102, or simply damage to the drive gear 110, shaft of the driver equipment 104, the driven gear 106, or the shaft of the pump 102.

With use of the present assembly 100, the shaft of the pump 102 is disconnected from the driven gear 106 when a torque on the driven gear 106 exceeds the operational torque of the pump 102. As disclosed earlier herein, the yield strength of the fasteners 148 is comparable or equal to the operational torque of the pump 102. Therefore, as the torque on the driven gear 106 exceeds the operational torque of the pump 102, the fasteners 148 undergo shear due to which a connection between the driven gear 106 and the shaft of the pump 102 is lost. This may allow the pump 102 to be mitigated from further damage and hence, abuse of the pump 102 may be prevented.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An assembly for preventing abuse of a pump mounted to a driver equipment, the assembly comprising:
  a shaft of the pump rotatable about a pump axis, and including a first set of splines;
  a driven gear of the pump;
  a driver gear of the driver equipment, the driver gear and the driven gear being mutually intermeshed;
  a coupler including a second set of splines, and the coupler being splined to the shaft of the pump by way of interfitting of the first set of splines and the second set of splines so as to rotate in unison with the shaft of the pump; and
  a plurality of fasteners each extending at least partially through the coupler and at least partially through the driven gear of the pump and releasably fastening the coupler to an end face of the driven gear, wherein the coupler is configured to transmit torque from the driven gear to the shaft, and wherein the fasteners are configured to shear, and disconnect the coupler from the driven gear when a torque on the driven gear exceeds an operational torque of the pump.

2. The assembly of claim 1 further comprising:
a shroud member defining a first aperture on a first sidewall, the first sidewall disposed proximal to a body of the pump; and
a hollow elongated stub-shaft including:
   a first flange held in abutment between the body of the pump and the first sidewall of the shroud member; and
   a hub member axially extending from the first flange and received within the shroud member via the first aperture, wherein the hub member is disposed about the shaft of the pump to define an elongated annular space therebetween.

3. The assembly of claim 2, wherein the coupler includes:
a collar disposed in the elongated annular space and rotatably connected to the hub member, the collar further splined to the shaft of the pump to rotate in unison with the shaft; and
a second flange laterally extending away from an end of the collar and configured to bear against the end face of the driven gear.

4. The assembly of claim 2, wherein the shroud member includes a second sidewall spaced apart from the driven gear and disposed in an opposing relation to the first sidewall.

5. The assembly of claim 4, wherein the second sidewall serves as a stop for axial movement of the coupler when the coupler is disconnected from the driven gear.

6. The assembly of claim 2 further including a thrust plate fastened to an end face of the hub member and held in abutment with the end face of the driven gear.

7. The assembly of claim 6, wherein the thrust plate is configured to axially restrain a movement of the driven gear upon shearing of the fasteners.

8. The assembly of claim 1, wherein the driven gear is configured to free-wheel in rotation with the driver gear upon shearing of the fasteners.

9. The assembly of claim 1, wherein the fasteners are configured to shear in a plane transverse to a longitudinal axis of the fasteners.

10. An assembly for preventing abuse of a pump mounted to a driver equipment, the driver equipment and the pump having a driver gear and a driven gear mutually intermeshed, the assembly comprising:
a shroud member defining a first aperture on a first sidewall, the first sidewall disposed proximal to a body of the pump;
a hollow elongated stub-shaft including:
   a first flange held in abutment between the body of the pump and the first sidewall of the shroud member; and
   a hub member axially extending from the first flange and received within the shroud member via the first aperture, wherein the hub member is disposed about a shaft of the pump to define an elongated annular space therebetween;
a coupler including:
   a collar disposed in the elongated annular space and rotatably connected to the hub member, the collar further coupled to the shaft of the pump to rotate in unison with the shaft;
   a second flange laterally extending away from an end of the collar and configured to bear against an end face of the driven gear;
   a plurality of fasteners configured to releasably fasten the coupler to an end face of the driven gear, wherein the coupler is configured to transmit torque from the driven gear to the shaft, and wherein the fasteners are configured to shear, and disconnect the coupler from the driven gear when a torque on the driven gear exceeds an operational torque of the pump.

11. The assembly of claim 10, wherein the shroud member includes a second sidewall spaced apart from the driven gear and disposed in an opposing relation to the first sidewall.

12. The assembly of claim 11, wherein the second sidewall serves as a stop for axial movement of the coupler when the coupler is disconnected from the driven gear.

13. The assembly of claim 10 further including a thrust plate fastened to an end face of the hub member and held in abutment with the end face of the driven gear.

14. The assembly of claim 13, wherein the thrust plate is configured to axially restrain a movement of the driven gear upon shearing of the fasteners.

15. The assembly of claim 10, wherein the fasteners are at least one of hex-bolts, allen screws, and grub screws.

16. The assembly of claim 10, wherein the fasteners are configured to shear in a plane transverse to a longitudinal axis of the fasteners.

17. A method of preventing abuse of a pump mounted to a driver equipment, the method comprising:
providing a coupler splined to a shaft of the pump by way of interfitting splines on the coupler and the shaft of the pump so as to rotate in unison with the shaft, wherein the coupler is configured to transmit torque from the driven gear to the shaft;
positioning a driver gear of the driver equipment and a driven gear of the pump so as to be mutually intermeshed; and
releasably fastening the coupler to an end face of the driven gear using a plurality of fasteners, wherein the fasteners are configured to shear, and disconnect the coupler from the driven gear when a torque on the driven gear exceeds an operational torque of the pump.

18. The method of claim 17, wherein the fasteners are at least one of hex-bolts, allen screws, and grub screws.

19. The method of claim 17 further including free-wheeling the driven gear in rotation with the driver gear upon shearing of the fasteners.

* * * * *